United States Patent [19]

Suzuki

[11] Patent Number: 5,303,359
[45] Date of Patent: Apr. 12, 1994

[54] ARRANGEMENT FOR SIMULTANEOUSLY TRANSLATING LOGICAL PAGE ADDRESSES TO CORRESPONDING REAL ONES IN DATA PROCESSING SYSTEM

[75] Inventor: Katsuyuki Suzuki, Tokyo, Japan
[73] Assignee: NEC Corporation, Tokyo, Japan
[21] Appl. No.: 631,002
[22] Filed: Dec. 19, 1990
[30] Foreign Application Priority Data
  Dec. 19, 1989 [JP] Japan .................. 1-330829
[51] Int. Cl.$^5$ ............................ G06F 12/10
[52] U.S. Cl. .................... 395/100; 364/DIG. 2; 364/955; 364/955.5
[58] Field of Search .................. 395/400, 425
[56] References Cited

U.S. PATENT DOCUMENTS

| | | | |
|---|---|---|---|
| 3,825,904 | 7/1974 | Burk et al. | 395/400 |
| 4,332,010 | 5/1982 | Messina et al. | 395/425 |
| 4,491,911 | 1/1985 | Sato | 395/400 |
| 4,691,281 | 9/1987 | Furui | 395/400 |

FOREIGN PATENT DOCUMENTS 0212129 3/1987 European Pat. Off. .

Primary Examiner—Joseph L. Dixon
Assistant Examiner—Rebecca L. Rudolph
Attorney, Agent, or Firm—Foley & Lardner

[57] ABSTRACT

A predetermined number of logical page addresses are effectively translated into corresponding real ones. The number of the logical page addresses is determined by (M+N) bits and, each of the logical page addresses includes upper M-bit and lower N-bit. Logical page address registers, whose number is equal to $2^N$, are provided to respectively store the predetermined number of logical page addresses applied. Address translation buffers (whose number is also equal to $2^N$) each stores $2^M$ real page addresses which are grouped according to each of the lower N bits. The address translation buffers receive the upper M-bit of one of the logical page addresses, and output real addresses. An address translation controller receives the outputs of the address translation buffers and also receives the lower N-bit, and selects the real page addresses using the lower N-bit. The selected real page addresses are applied to a plurality of real address registers. A page number comparator determines whether or not the upper M-bit of one of the logical page address coincides with the upper M-bit of each of the remaining logical page addresses. The page number comparator outputs the comparison results which allow the real address(es) stored in the real address registers to be applied to a main memory.

2 Claims, 4 Drawing Sheets

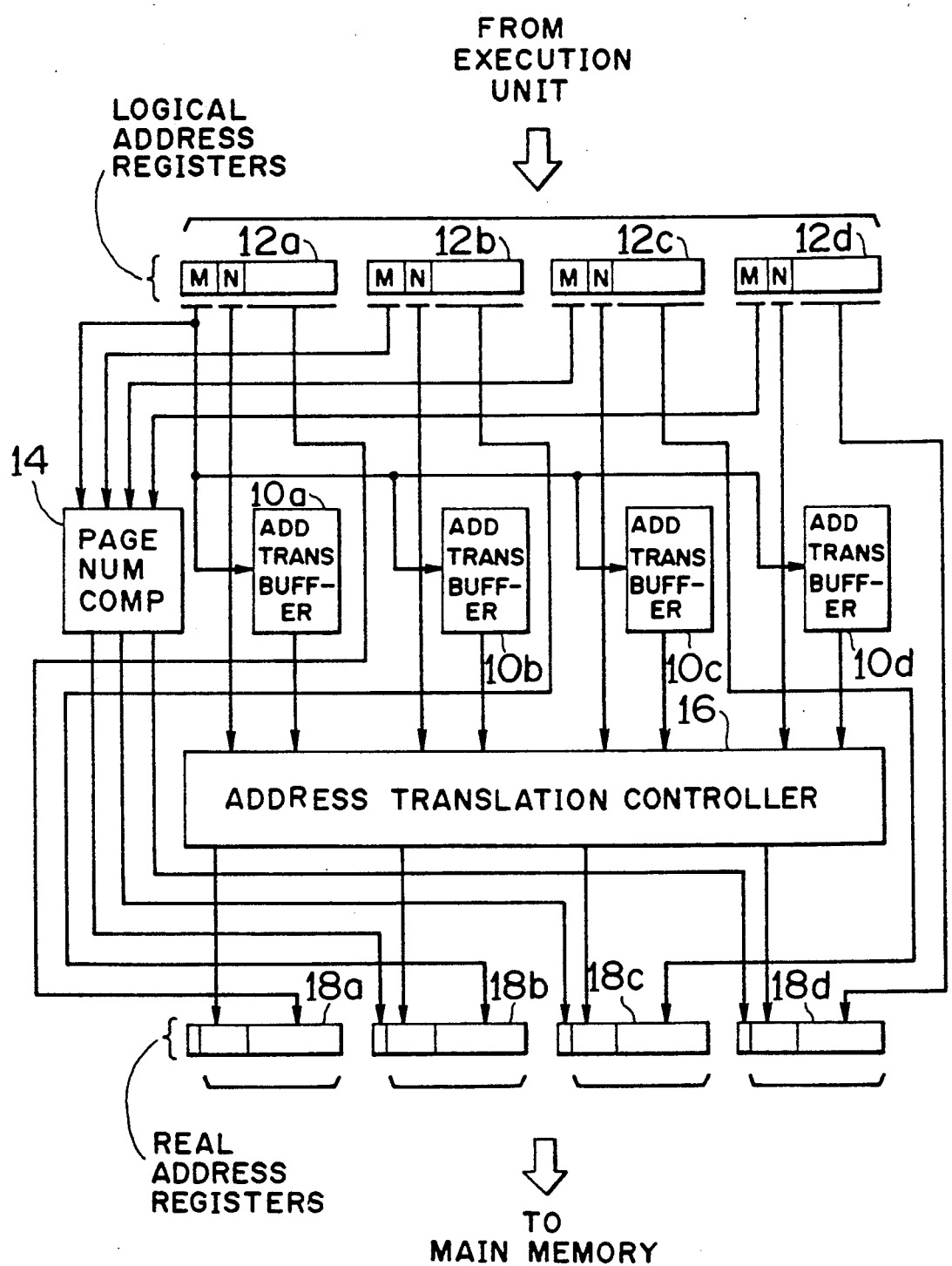

ARRANGEMENT FOR SIMULTANEOUSLY TRANSLATING LOGICAL PAGE ADDRESSES TO CORRESPONDING REAL ONES IN DATA PROCESSING SYSTEM

BACKGROUND OF THE INVENTION

1. Field of the Invention

The present invention relates to an arrangement for translating logical (or virtual) page addresses into corresponding real ones in data processing systems using virtual memory techniques.

2. Description of the Prior Art

A so-called supercomputer has found extensive uses in high speed mathematical or scientific tasks such as in weather forecast simulation, image data processing for natural resources, etc. It is known in the art that such a very powerful mainframe adopts high-level operations that work on vectors (viz., linear arrays of numbers) utilizing a virtual memory technique. The virtual memory is a large imaginary main memory made available by loading smaller pages from a backing store into a main memory as they are required.

The mechanism used to define the relationship between the logical (or virtual) address space that the program thinks it is controlling, and the actual main memory locations being utilized, is called an "address translation".

In order to accelerate the page address translation, it is a common practice to prepare one or more address translation buffers into which a page address translation table(s) has previously been transferred from a main memory.

One known approach to performing high-speed page address translation, is to translate all the logical page addresses at a time by preparing a plurality of address translation buffers, the number of which is equal to the entire number of logical pages. Although this method is able to attain the address translation at a high speed and hence a high throughput, it has encountered the problem in that a bulky hardware arrangement is undesirably required.

Another known approach is to prepare a plurality of address translation buffers and then implement address translation of a plurality of consecutive logical pages at a time according to a heading number of the consecutive logical pages to be translated and a direction (increasing or decreasing direction) of the consecutive page numbers. This prior art has been disclosed in Japanese patent application publication No. 63-62012 issued for public inspection on Dec. 1, 1988. This prior art features an effective address translation without an undesirable increase in hardware, but has encountered the problem in that it is unable to implement address translation of a plurality of logical pages at any given time if a program requires random logical pages in the case of indirect addressing.

SUMMARY OF THE INVENTION

It is an object of the present invention to provide an arrangement for translating logical page addresses into corresponding real ones without undesirable increase in hardware.

Another object of the present invention is to provide an arrangement for translating logical page addresses into corresponding real ones without referring to the increasing or decreasing direction of consecutive logical page numbers to be translated.

In brief, the above object is achieved by an arrangement by which a predetermined number of logical page addresses are effectively translated into corresponding real ones. The number of the logical page addresses is determined by (M+N) bits and, each of the logical page addresses includes upper M-bit and lower N-bit. Logical page address registers, whose number is equal to $2^N$, are provided to respectively store the predetermined number of logical page addresses applied. Address translation buffers (whose number is also equal to $2^N$) each stores $2^M$ real page addresses which are grouped according to each of the lower N bits. The address translation buffers receive the upper M-bit of one of the logical page addresses, and output real addresses. An address translation controller receives the outputs of the address translation buffers and also receives the lower N-bit, and selects the real page addresses using the lower N-bit. The selected real page addresses are applied to a plurality of real address registers. A page number comparator determines whether or not the upper M-bit of one of the logical page address coincides with the upper M-bit of each of the remaining logical page addresses. The page number comparator outputs the comparison results which allow the real address(es) stored in the real address registers to be applied to a main memory.

More specifically an aspect of the present invention comes in an arrangement which is provided in a data processing system wherein a logical address space is equally divided into a plurality of (M+N) pages and is accessible by a program, the arrangement being provided for translating a predetermined number of logical page addresses into corresponding real page addresses, the number of the logical page addresses being defined by (M+N) bits, each of the logical page addresses including upper M-bit and lower N-bit, the arrangement comprising: a plurality of first means, the number of the first means being equal to $2^N$, each of the first means being arranged to store $2^M$ real page addresses each of which is defined by one of the numbers determined by N-bit, each of the first means receiving the upper M-bit of a first logical page address of the predetermined number of logical page addresses and outputting a real page address defined thereby; second means, the second means being coupled to the plurality of the first means and comparing the upper M-bit of the first logical page address with the upper M-bit of each of the remaining logical page addresses of the predetermined number of the logical page addresses, the second means outputting first and second logic signals in the event that the comparison result indicates consistency and inconsistency respectively; and third means, the third means being coupled to receive the real page addresses from the first means and receive the first and second logic signals, the third means outputting the real page address corresponding to the logical page address in connection with which the second means has outputted the first signal.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIG. 1 is a block diagram illustrating an arrangement, according to the present invention, for translating logical (viz., virtual) page addresses into corresponding real (viz., physical) ones;

DETAILED DESCRIPTION OF THE PREFERRED EMBODIMENTS

Figure 2A:
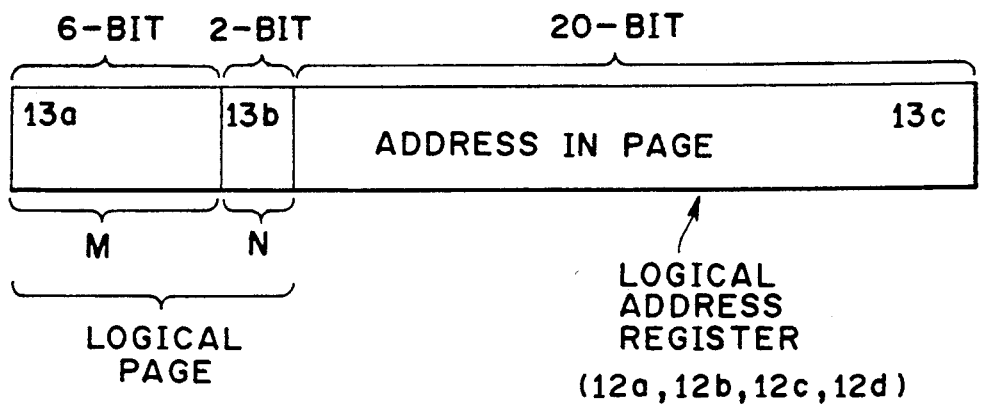
FIG. 2A shows a storage format of a logical address register forming part of the FIG. 1 arrangement.

A preferred embodiment of this invention will be discussed with reference to FIGS. 1 to 5, in which FIG. 1 illustrates the overall arrangement of the embodiment while FIGS. 2-5 show the blocks of FIG. 1 in detail.

It is assumed that logical address space is equally divided into (M+N) pages each of which is specified by (M+N) bits. It is further assumed for the sake of discussion that M=six (bits) and N=two (bits). It follows in this particular embodiment that the number of logical (viz., virtual) pages is 256 (=$2^8$) while the number of real (viz., physical) pages is 32 ($2^5$).

The arrangement shown in FIG. 1 comprises: address translation buffers 10a, 10b, 10c and 10d the number of which is $2^N$ (N=2); logical address registers 12a, 12b, 12c and 12d; a page number comparator 14; an address translation controller 16; and real address registers 18a, 18b, 18c and 18d.

Each of the four registers 12a-12d is supplied with a logical address from an execution unit (not shown) provided outside of the FIG. 1 arrangement.

As shown in FIG. 2A, storage format of each of the logical address registers 12a-12d comprises a page portion (M+N=8 bits) and an in-page address portion 13c (which is assumed to be 20 bits). The terminology "in-page address portion" implies in the instant specification, a storage portion allocated to the addresses included in a given page. The page portion is divided into upper and lower sections 13a, 13b which occupy 6-bit and 2-bit respectively. The address stored in the in-page address portion 13c is directly transferred into the counterpart thereof (viz., 19c) in a manner which will be referred to later.

Figure 2B:
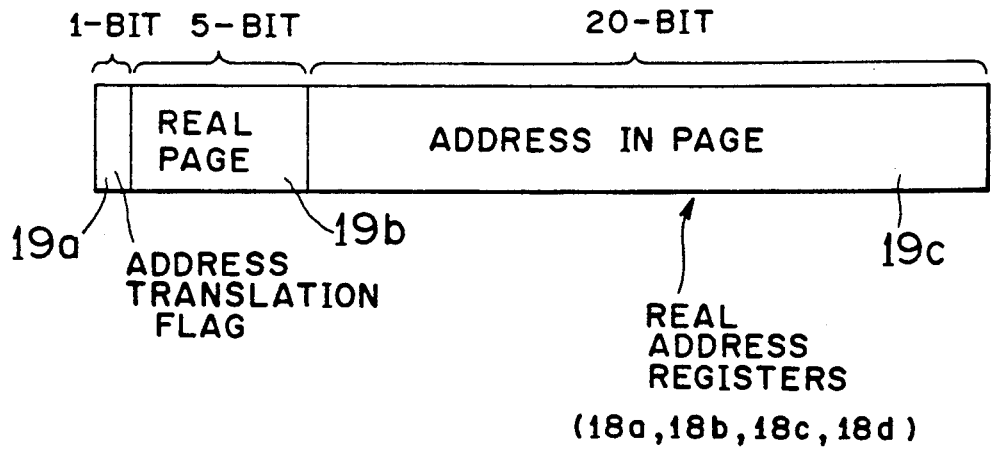
FIG. 2B shows a storage format of a real address register forming part of the FIG. 1 arrangement.

FIG. 2B shows storage format of each of the real address registers 18a-18d. The storage format comprises an address translation flag 19a (1-bit), a real page portion 19b (5-bit) and the in-page address portion 19c (20 bits). In the event that the flag 19a assumes a logic 0, the content of the corresponding real address register (18a-18d) is applied to a main memory (not shown). Contrarily, if the flag 19a assumes a logic 1, the real address stored in the corresponding register (18a-18d) is not applied to the main memory. It should be noted that the flag portion of the real address register 18a always assumes a logic 0, and hence the real address stored in the register 18a is applied to a main memory (not shown) without exception.

Figure 3:
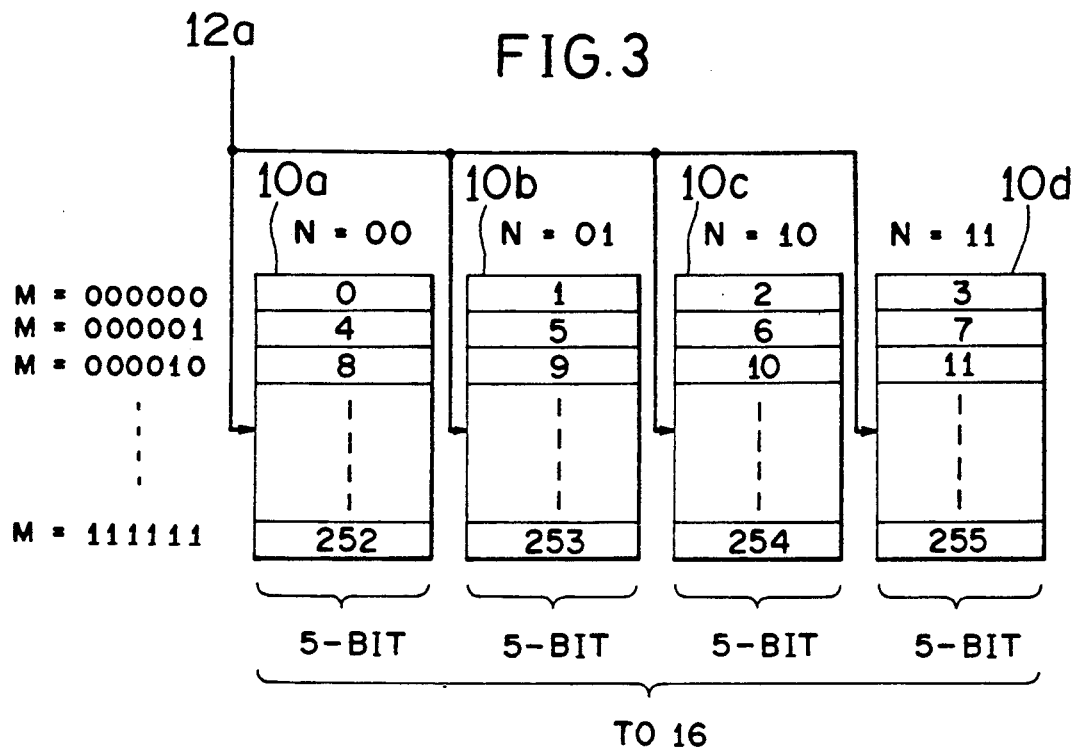
FIG. 3 is a block diagram showing in detail, an address translation buffer which forms part of the FIG. 1 arrangement.

FIG. 3 shows storage format of each of the address translation buffers 10a, 10b, 10c and 10d, which are respectively assigned to N=00, N=01, N=10 and N=11. Further, each of the buffers 10a-10d is provided with 64 storage sections, denoted by M=000000, ..., M=111111. Accordingly, the total number of memory sections of the buffers 10a-10d is 256 (=4×64) each of which is supplied with a real page address from the execution unit (not shown) and which memorizes the same therein. The numerals 0, 1, 2, 3, 4, ..., 254, and 255 in FIG. 3 denote the numbers of the memory sections each of which occupies 5-bit.

Figure 4:
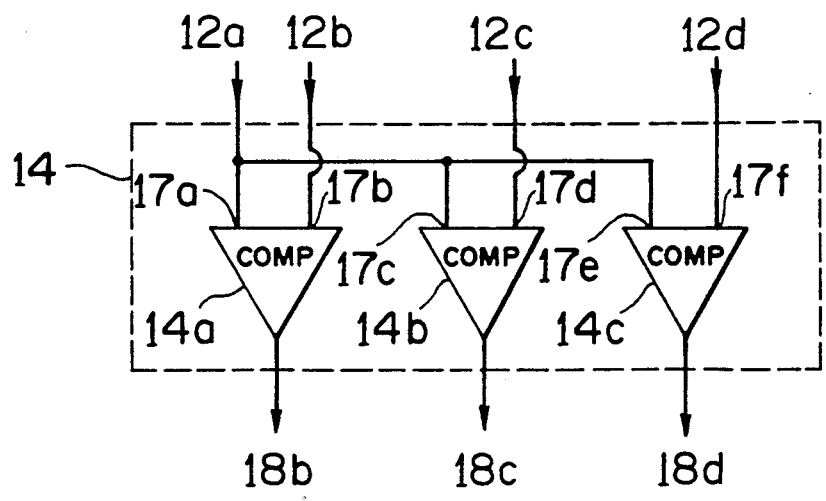
FIG. 4 is a block diagram showing in detail, a page number comparator which is included in the FIG. 1 arrangement.

FIG. 4 illustrates the page number comparator 14 in detail, which comprises three comparators 14a, 14b and 14c. The upper M-bit (viz., 6-bit) of the logical address register 12a is applied to all the comparators 14a, 14b and 14c via terminals 17a, 17c and 17e. On the other hand, the upper 6-bits of the register 12b is applied to the comparator 14a via a terminal 17b. Similarly, the upper 6-bits of the register 12c is applied to the comparator 14b via a terminal 17d while the upper 6-bits of the register 12d is applied to the comparator 14c by way of a terminal 17f. The comparator 14a compares the two 6-bit address data applied thereto on a bit-by-bit basis, and issues a logic 0 in the event that the two 6-bit address data applied are coincide. Otherwise, the comparator 14a produces a logic 1. The other comparators 14b and 14c each performs the same function.

Figure 5:
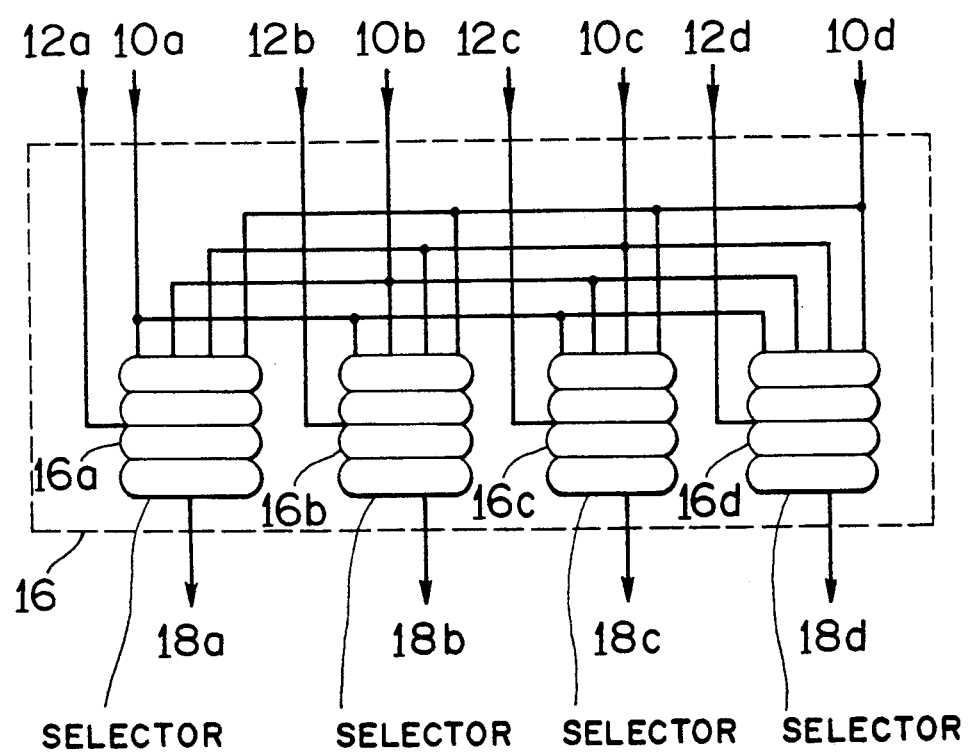
FIG. 5 is a block diagram showing details of an address translation controller which forms part of the FIG. 1 arrangement.

FIG. 5 shows in detail, the address translation controller 16 which, in this embodiment includes four selectors 16a, 16b, 16c and 16d. These selectors 16a-16d are respectively supplied with the lower page address (2-bit) of the logical address registers 12a-12d as selector signals. Further, each of the selectors 16a-16d receives the outputs of the address translation buffers 10a-10d. In the event that the selector 16a receives a bit sequence N=01 by way of example, the selector 16a outputs a real page address applied thereto from the address translation buffer 10b.

The operation of the instant embodiment will now be described. The registers 12a-12d have already stored logical addresses applied from the execution unit (not shown). Merely for the convenience of discussion, it is assumed that the page addresses (M+N) of the registers 12a-12d are:

Register 12a=000010(M)+00(N);
Register 12b=000010(M)+01(N);
Register 12c=000011(M)+00(N); and
Register 12d=000010(M)+11(N).

This means that the page address stored in the register 12c is not continuous with or equal to the other page addresses in the registers 12a, 12b and 12d. The upper page bits "000010" in the section 13a of the register 12a is applied to the address translation buffers 10a, 10b, 10c and 10d. In compliance with the above-mentioned assumption, the buffers 10a-10d supply the selectors 16a-16d of the controller 16 (FIG. 5) with the real page addresses stored in the memory sections Nos. 8, 9, 10 and 11 (FIG. 3), respectively.

The selectors 16a-16d are also supplied with the contents of the lower bits (13b) of the registers 12a-12d, respectively. Since it has been assumed that the lower bits of the registers 12a-12d is "00", "01", "00" and "11", the selectors 16a-16d picks up the real page addresses derived from the memory sections Nos. 8, 9, 10 and 11, and apply them to the real page portions (19b) of the real address registers 18a-18d, respectively.

As previously referred to, all the comparators 14a, 14b and 14c (FIG. 4) are supplied with the upper M-bits (viz., 6-bit) of the logical address register 12a. On the other hand, the upper 6-bits of the register 12b is applied to the comparator 14a. Similarly, the upper 6-bits of the register 12c to the comparator 14b while the upper 6-bits of the register 12d to the comparator 14c. The comparator 14a compares the two 6-bit address data applied thereto on a bit-by-bit basis, and applies a logic 0 to the address translation flag of the register 18b in the event that the two 6-bit address data applied are coincide. Otherwise, the comparator 14a applies a logic 1 to the flag of the register 18b. The other comparators 14b and 14c each performs the same function. As mentioned above, the flag of the register 18a always retains a logic 0. A logic 0 in each of the registers 18a–18d allows the real page address thereof plus the content of the memory portions 19c to be applied to the main memory. It should be noted that the content of the memory portion 13c of each of the registers 12a–12d is directly transferred to the counterpart thereof 19c of each of the registers 18a–18d.

While the foregoing description described one embodiment according to the present invention, the various alternatives and modifications possible without departing from the scope of the present invention, which is limited only by the appended claims, will be apparent to those skilled in the art.

What is claimed is:

1. An apparatus in a data processing system wherein a logical address space is divided into a plurality of (M+N) logical pages and is accessible by a program, said apparatus being provided for simultaneously translating a predetermined number of logical page addresses into corresponding real page addresses, said (M+N) logical pages being defined by (M+N) bits, each of said logical page addresses including upper M-bits and lower N-bits, said apparatus comprising:

first to $2^N$-th logical address registers respectively storing the logical page addresses to be translated;

first to $2^N$-th address translation buffers, each of said address translation buffers storing $2^M$ real page addresses, each of said address translation buffers corresponding to one of the numbers determined by said N-bits, each of said first to $2^N$-th address translation buffers being coupled to receive the upper M-bits of said first logical address register and each said address translation buffer outputting a real page address therefrom;

first to $(2^N-1)$-th comparators coupled to said first to $2^N$ logical address registers, said comparators respectively comparing the upper M-bits applied from said first logical page address register with the upper M-bits applied from each of the second to $(2^N)$-th logical address registers, each of said first to $(2^N-1)$-th comparators generating a logical signal assuming one of a first and second logical value, respectively indicating the comparison result is coincidence and no coincidence;

first to $2^N$-th selectors, each selector being coupled to receive outputs of said first to $2^N$-th address translation buffers and each selector being coupled to respectively receive the N-bits of said first to $2^N$-th logical address registers as selector control signals; and first to $2^N$-th real address registers each including an address translation flag portion and a real page portion and which are respectively coupled to receive, at the real page portions thereof, outputs of said first to $2^N$-th selectors, the address translation flag portion of said first real address register storing a logical signal corresponding to said first logical value, the second to $2^N$ real address registers being coupled to respectively receive, at the translation flag portions thereof, said logical signals from said first to $(2^N-1)$-th comparators.

2. The apparatus as claimed in claim 1, wherein N is a number greater than 1.

* * * * *